United States Patent [19]

Libby

[11] 4,413,180
[45] Nov. 1, 1983

[54] METHOD AND APPARATUS FOR IMAGE ACQUISITION UTILIZING A HOLLOW SHAFT MOTOR AND A CONCAVE, CYLINDRICAL REFLECTOR

[75] Inventor: Charles J. Libby, West Roxbury, Mass.

[73] Assignee: Automatix Incorporated, Billerica, Mass.

[21] Appl. No.: 458,836

[22] Filed: Jan. 18, 1983

Related U.S. Application Data

[63] Continuation-in-part of Ser. No. 352,597, Feb. 26, 1982.

[51] Int. Cl.³ .............................................. H01J 3/14
[52] U.S. Cl. .................................... 250/236; 350/6.9
[58] Field of Search ............... 250/560, 561, 234, 235, 250/236; 350/6.6, 6.9, 293; 356/1, 4, 376

[56] References Cited
U.S. PATENT DOCUMENTS

4,311,357  1/1982  Lang ..................................... 350/6.9
4,344,666  8/1982  Birgmeir et al. ..................... 350/6.9

Primary Examiner—David C. Nelms
Assistant Examiner—Darwin R. Hostetter
Attorney, Agent, or Firm—Richard J. Birch

[57] ABSTRACT

A method and apparatus for image acquisition utilizing a non-planar beam of electro-magnetic radiation, such as, a hollow conical beam of light, to illuminate at least a portion of an object. The conical beam of light is generated by impinging a light beam on the surface of a concave, cylindrical reflector. The light beam enters the concave cylindrical reflector through the hollow shaft of a motor. The illuminated portion of the object is imaged on an array of photosensitive elements to produce corresponding signals that are representative of the image on the array. These signals can be used to obtain identification information concerning the object and guidance information for a plural axis manipulator employed in conjunction with the object. In one application the image acquisition apparatus is used in a robot to provide control signals for guiding the robot tool along a path, such as, a welding seam.

28 Claims, 12 Drawing Figures

METHOD AND APPARATUS FOR IMAGE ACQUISITION UTILIZING A HOLLOW SHAFT MOTOR AND A CONCAVE, CYLINDRICAL REFLECTOR

CROSS-REFERENCE TO RELATED APPLICATIONS

The present application is a Continuation-in-Part application of my application Ser. No. 352,597, filed Feb. 26, 1982 for Method and Apparatus For Image Acquisition and is related to my application Ser. No. 458,932 for Method and Apparatus For Image Acquisition Utilizing A Concave, Cylindrical Reflector and filed simultaneously herewith.

BACKGROUND OF THE INVENTION

The present invention relates to sensor systems in general and, more particularly, to a method and apparatus for image acquisition utilizing a concave, cylindrical reflector for beam generation.

Recent developments in the robotics industry have highlighted the need for accurate vision systems not only for parts identification, but also for robot guidance. U.S. Pat. No. 4,105,925, is an example of an optical object locator which determines the position and orientation of parts on a moving conveyor through the use of two planes of light that intersect at a single transverse line on the conveyor circuit. The two planes of light are located at an acute angle with respect to the conveyor. A linear diode array is aligned with the single line of light on the conveyor. When a part or other object on the conveyor moves through the line of light, it intercepts the light above the conveyor at positions spaced laterally from the line of light. The linear diode array senses only the line segments on the conveyor located beyond the object or part boundaries. Through the use of electronic sampling of the illumination on linear array, the object or part boundaries are determined and the part shape and orientation are thereby detected.

Automated arc-welding or seam welding is a recent and expanding addition to the manufacturing process, particularly in the automotive industry. Although the quality and consistency of the finished weld is high, difficulties inherent in the process have to be addressed in the design of a robotic system. Arc-welding is often one of the last in a series of manufacturing steps, each of which may contribute tolerance errors to piece parts. Furthermore, the welding process itself introduces thermal stresses and deformations in the weldment. Typically, the repeated presentation of parts to be welded is accomplished by fixturing or tooling which fixes in space the components to be joined. The accuracy of this positioning will influence the final tolerance of the weldment.

A skilled human welder will adapt his welding to accomodate the vagaries of weldment seam position and fit-up. However, there exists few effective mechanisms in automated welding to accomplish these ends. It is estimated that at least thirty percent of the welding tasks otherwise appropriate for robot welding do not meet the minimum criteria for accuracy in dimensionality, part fit-up or fixture positioning.

In order to achieve the maximum benefits from robotic arc welding, the welding apparatus should be able to determine the geometry and location of the weld seam in the presence of the welding arc by mens of a suitable vision sensor. Given this information, adjustments then can be made to position accurately the welding torch and thus, accomodate inaccuracies in the weldment.

It is accordingly, a general object of the present invention to provide a method and apparatus for image acquisition.

It is a specific object of the invention to provide a method and apparatus for image acquisition which utilizes a non-planar beam of electro-magnetic radiation to illuminate an object which is thereafter imaged on a detector to produce corresponding signals representative of the image thereon.

It is another specific object of the invention to provide a method and apparatus for image acquisition in which the non-planar beam of electro-magnetic radiation takes the form of a hollow conical beam of light that is generated by means of a concave, cylindrical reflector.

It is still another specific object of the invention to provide a method and apparatus for image acquisition in the presence of high ambient noise at the object whose image is thereafter acquired.

It is a further object of the invention that the image acquisition apparatus can be used in conjunction with a plural axis manipulator to provide guidance and identification information.

It is a feature of the invention that the method thereof can be practiced with relatively conventional electro-optical components.

BRIEF DESCRIPTION OF THE DRAWINGS

The above objects and features of the invention will best be understood from a detailed description of a preferred embodiment thereof, selected for purposes of illustration, and shown in the accompanying drawings in which:

FIG. 11 is a view in cross-section showing another alternative method and apparatus for generation of the hollow conical beam; and, FIG. 12 is a view in side elevation showing still another alternative method and apparatus for generation of the hollow conical beam.

DETAILED DESCRIPTION OF THE INVENTION

Turning now to the drawings, the basic concept of the method of the present invention can best be understood by referring to FIGS. 1 through 5 and 8 of the drawings.

Figure 1:
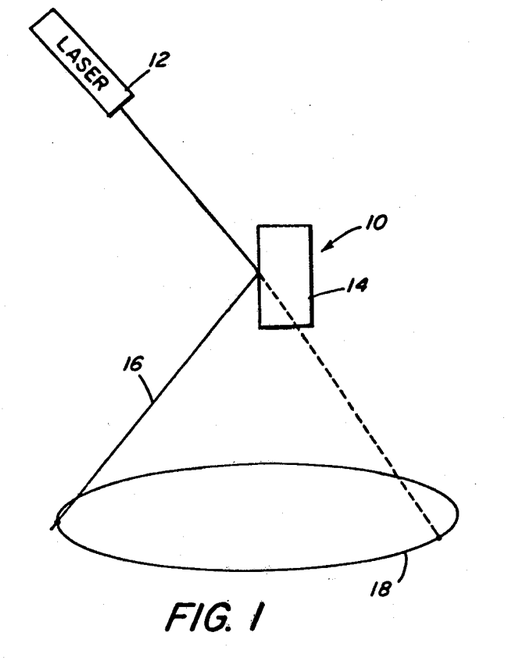
FIG. 1 is a diagrammatic view in side elevation showing the generation of a non-planar, conical beam.
Figure 2:
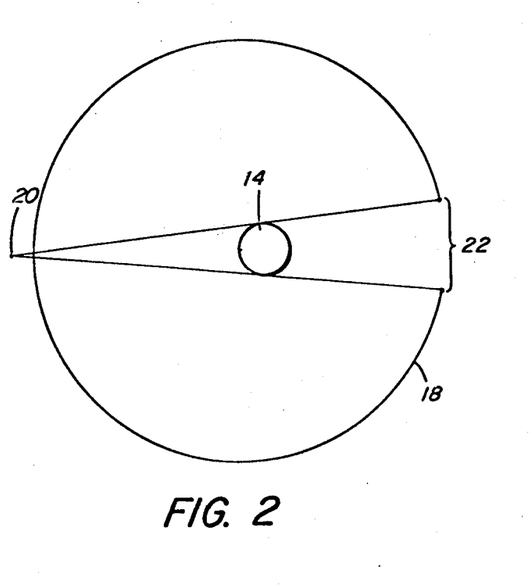
FIG. 2 is another diagrammatic view in plan showing the intercept of the non-planar, conical beam on a plane.

Looking at FIG. 1, the non-planar beam generation apparatus indicated generally by the reference numeral 10 comprises a light source such as, laser 12, and a reflective cylinder 14. The light from laser 12 impinges on cylinder 14 to produce a structural light pattern or beam 16 of light having a shaped surface approximating a conic surface. The intercept of the beam 16 on a plane is shown by intercept 18.

If the laser 12 and reflective cylindrical mirror 14 are fixed with respect to each other, the arcuate length of the intercept 18 is governed by the beam width of light from laser 12 impinging upon the reflective cylinder 14. It can be seen in FIG. 2 that light from a source 20, such as the previously mentioned laser 12, is occluded by the reflective cylinder 14 to produce a gap 22 in the intercept 18.

Figure 3:
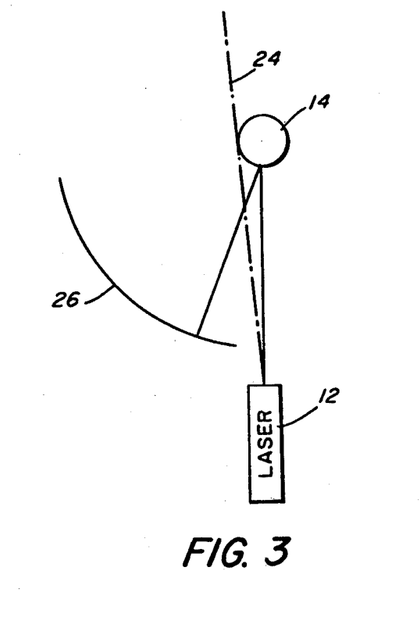
FIG. 3 is another diagrammatic view in plan showing the effect of sweeping a beam of light across a reflective cylinder to generate an angular arc beam intercept.

The angular arc length of intercept 18 is not only a function of the beam width of the beam impinging upon the cylindrical mirror 14, but also upon the location of that beam on the cylindrical mirror. This is illustrated in FIG. 3 by means of the solid line beam trace from laser 12 to mirror 14 and by the location of the same beam in a scanned position shown by the dashed line 24. Scanning of the laser beam from the solid position to the dashed position shown by line 24 produces an intercept arc 26. Thus, by scanning the laser beam across the surface of mirror 14, one can create a hollow conical beam having an angular arc of selected length. The term "conical beam" as used herein means a beam having the general shape of the surface of a cone i.e., a hollow cone. This beam configuration can be compared to the structural shape of the cone portion of an ice cream cone. Although the term "conical beam" will be used hereafter, it should be understood that the generalized description for the beam configuration is "non-planar" and that the "conical beam" is only one of a number of subsets of non-planar beam configurations.

Figures 4, 5:
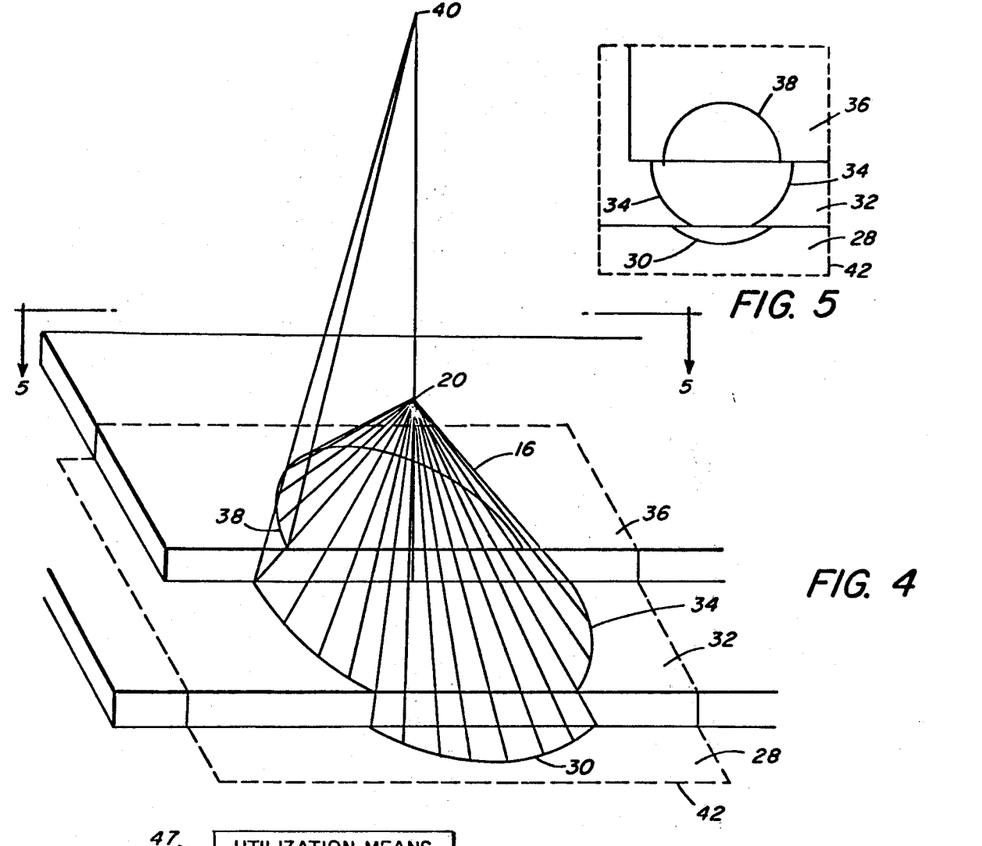
FIG. 4 is a view in perspective showing the intercept generated by the non-planar, conical beam on three parallel intercept planes that are spaced at different distances from the source of the conical beam.
FIG. 5 is a view of the image plane of FIG. 4 showing the beam intercepts at the intercept planes.

The previous description of the basic concept of the invention was directed to the intercept of the conical beam with a single plane. In order to fully appreciate the information that can be derived from plural intercepts, it will be helpful to examine FIGS. 4, 5 and 8. FIG. 4 illustrates the intercepts produced by conical beam 16 from source 20 as it intercepts three intercept planes. The intercept plane 28 located furthest from source 20 produces an intercept 30. In a similar manner, an intermediate distance intercept plane 32 produces an intercept 34 while the closest intercept plane 30 produces an intercept 38. When these intercepts are viewed from an image objective 40, their images on an image plane 42 are located as shown in FIG. 5.

Figure 8:
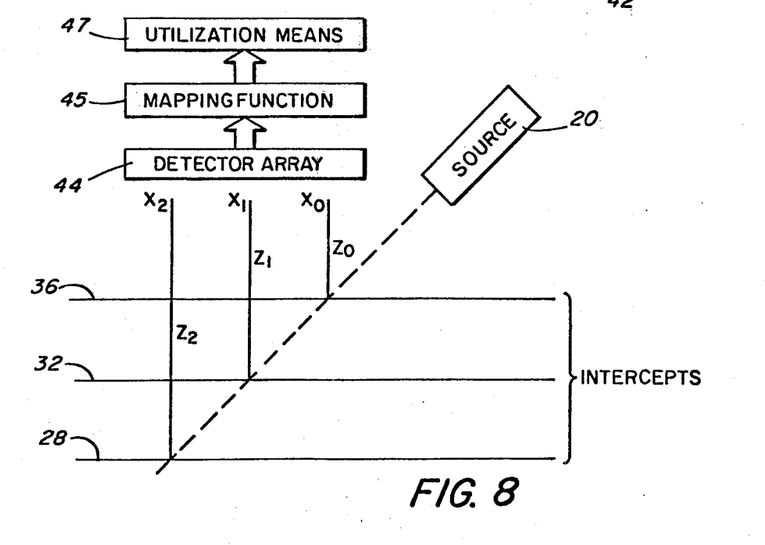
FIG. 8 is a diagrammatic view in partial block form illustrating the generation of the intercepts of FIG. 4.

The geometric relationships of the intercept planes 28, 32 and 36 are also shown in FIG. 8 wherein the intercept points $X_0$, $X_1$ and $X_2$ are imaged onto a photosensitive detector array 44 that produces corresponding signals representative of the image or images thereon. The intercepts of the structured light of the conical beam thus provide a unique profile of the terrain geometry of the portion of an object illuminated by the beam. With this information, a variety of functions can be performed with the detector array output signals, including a mapping function 45 for inputting to a utilization means 47 to provide identification and guidance information with respect to the beam illuminated object.

Figures 6, 7:
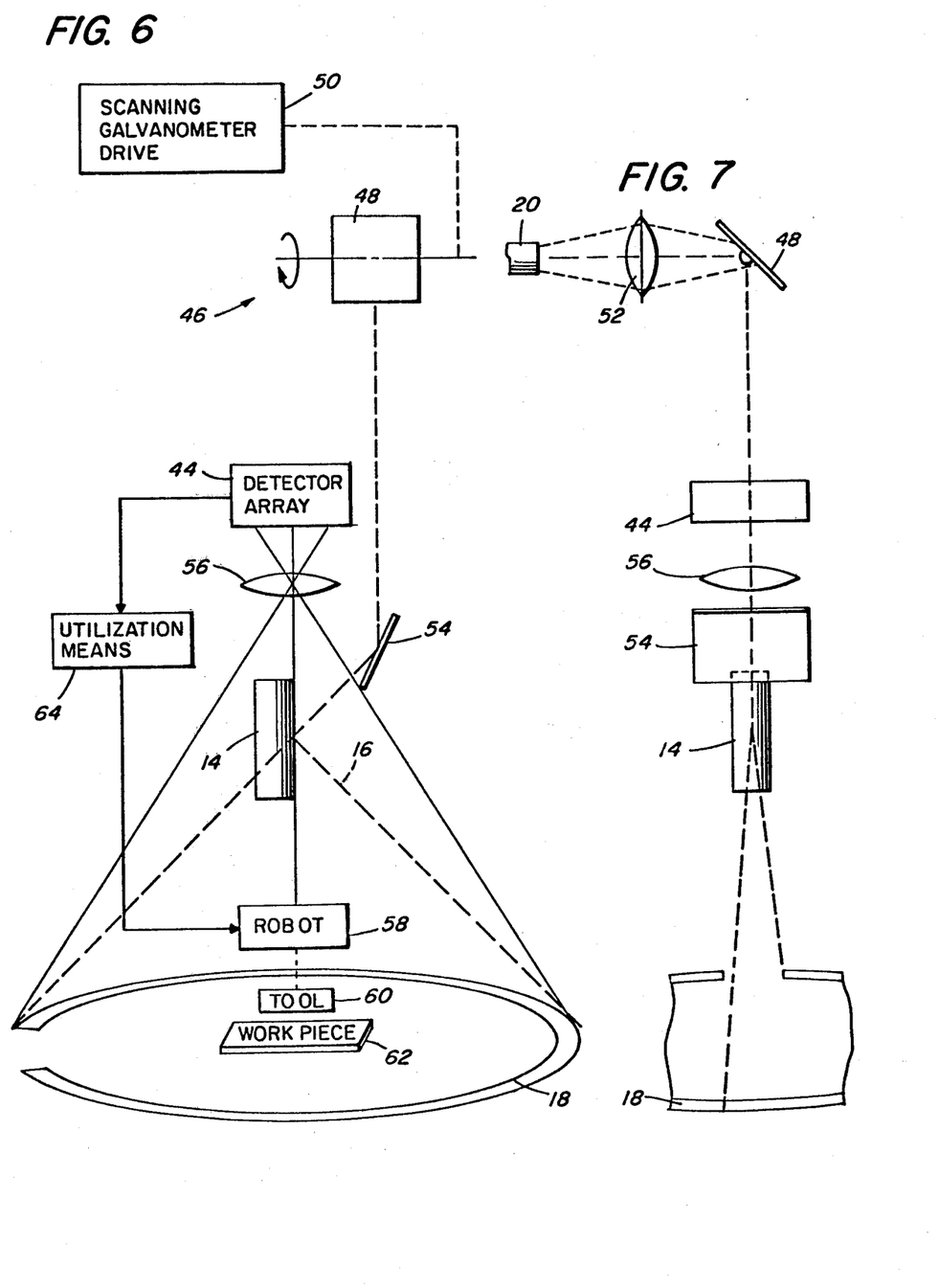
FIG. 6 is a view in perspective and partial block form showing the image acquisition apparatus used in conjunction with a robot.
FIG. 7 is a view in partial perspective and block form showing the optical system of FIG. 6 with the robot, tool and workpiece omitted for purposes of clarity.

Referring now to FIGS. 6 and 7, the conical beam is formed by directing the light from source 20 to a scanning galvanometer indicated generally by the reference numeral 46. The mirror 48 of the scanning galvanometer is rotated by a scanning galvanometer drive 50. The light from source 20 passes through objective 52 onto the rotatable surface of mirror 48 where it is directed to mirror 54 and then to the reflective surface of the cylindrical mirror 14 to produce the previously mentioned conical beam 16. The beam intercept 18 is imaged onto the detector array 44 by an optical system indicated by the reference numeral 56. The image acquisition system shown in FIGS. 6 and 7 is used in conjunction with a robot 58 having a tool 60 for use with a workpiece 62. The robot 58, tool 60 and workpiece 62 are illustrated diagrammatically in block form in FIG. 6. (These elements have been omitted from FIG. 7 for purposes of clarity.)

The term "robot" is used herein in the U.S. robotic industry sense. However, it should be understood that the image acquisition method and apparatus of the invention can be used in conjunction with the more generalized apparatus known as a "plural axis manipulator". Thus, the invention is suitable for side beam welders (only two axis, X and Y, movement with Z axis adjustment) as well as "robots" as defined by the industry.

The signals from detector array 44 corresponding to the image of intercept 18, are applied to a suitable utilization means 64. The utilization means 64 can perform an identification function by comparing the intercept image information to a known pattern and/or provide appropriate control signals to robot 58 to control the positional relationship between the robot tool 60 and workpiece 62.

The robot tool 60 shown in FIG. 6 has a selected positional relationship with respect to the conical beam 16. If the tool 60 is located generally co-axially with the axis of the conical beam 16, geometries can be simplified and the beam intercept 18 can be formed to substantially surround the robot tool 60 thereby providing a "look ahead" feature.

The angular arc length of beam intercept 18 can be controlled conveniently by varying the amplitude of the alternating current applied to the scanning galvanometer from drive 50. The intercept 18 can be "steered" by applying a direct current bias to the scanning galvanometer from drive 50.

Figures 9, 10:
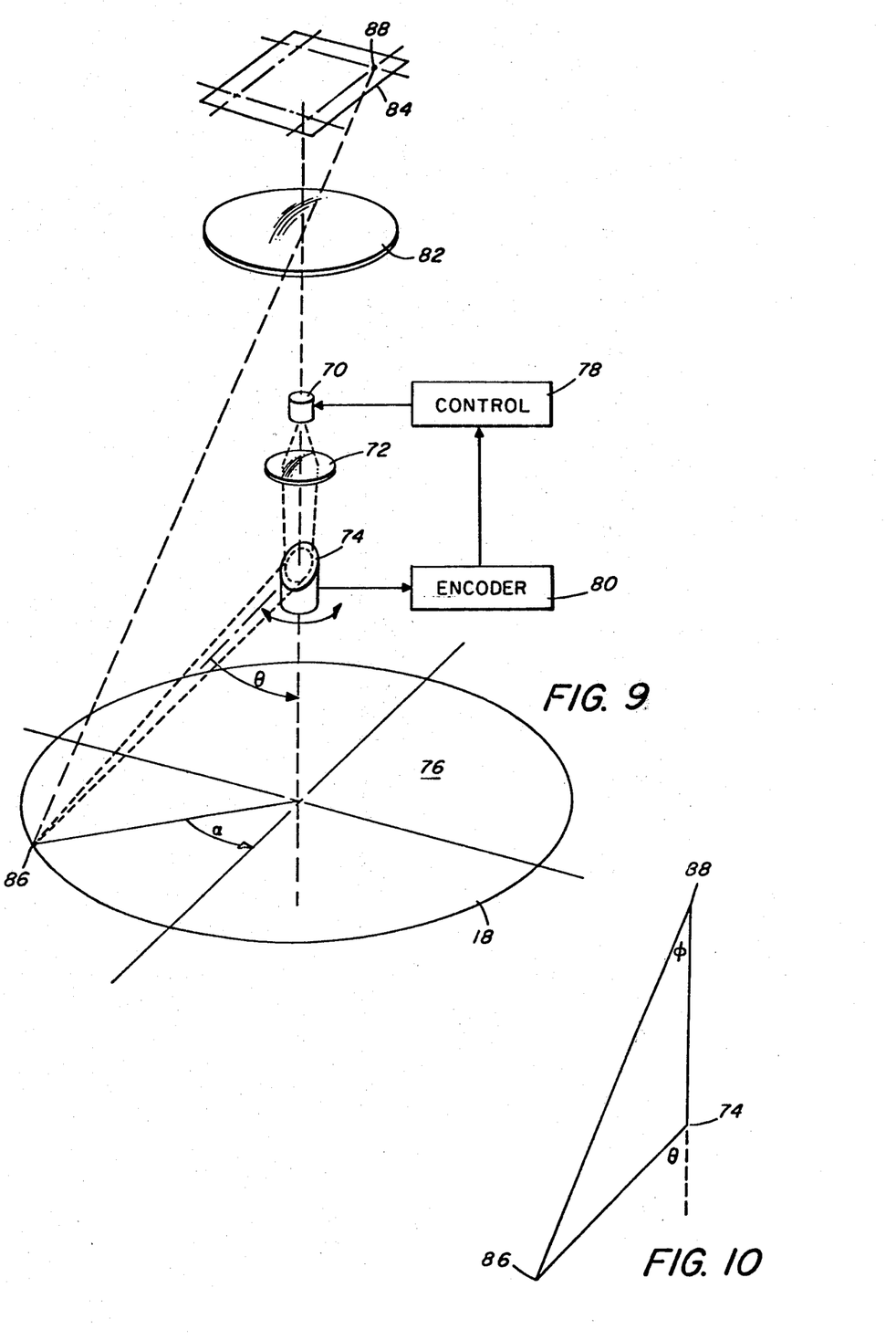
FIG. 9 is a view in perspective and partial block form showing an alternative method and apparatus for generation of the hollow conical beam.
FIG. 10 is a diagram of the geometry of the system shown in FIG. 9.

FIG. 9 illustrates an alternative method and apparatus for generating the conical light beam. Light from a source 70 is directed by optics 72 onto the surface of a rotating mirror 74 which in turns directs the light onto a plane surface 76. Full rotation of the mirror 74 produces a circular intercept 18. The angular arc length of the intercept 18 can be controlled by varying the time the light source 70 is "on" during a full rotation of rotatable mirror 74. The light source 70 can be on for the entire duration or less during a single rotation of the mirror 74. Control of the duration of the "on" cycle of light source 70 is provided by means of a control circuit 78. The angular position of the rotating mirror 74 is determined by an encoder 80 which can be used to provide angular position information for control circuit 78.

The conical beam intercept 18 is imaged by means of optics 82 onto a X, Y sensor 84. A suitable single spot only sensor is manufactured by United Detector Technology.

FIG. 9 illustrates the imaging of the focused conical beam light spot 86 onto the single spot only X-Y sensor 84 at point 88. The geometric relationships of beam spot 86, image 88 and mirror 74 are shown in FIGS. 9 and 10. Since the angles $\phi$ and $\theta$ are known and the angle $\alpha$ is specified by the encoder 80, and since the distance between the image point 88 and mirror 74 is also known, the necessary information is available to analyze the terrain geometries of an object illuminated by the conical beam.

Figures 11, 12:
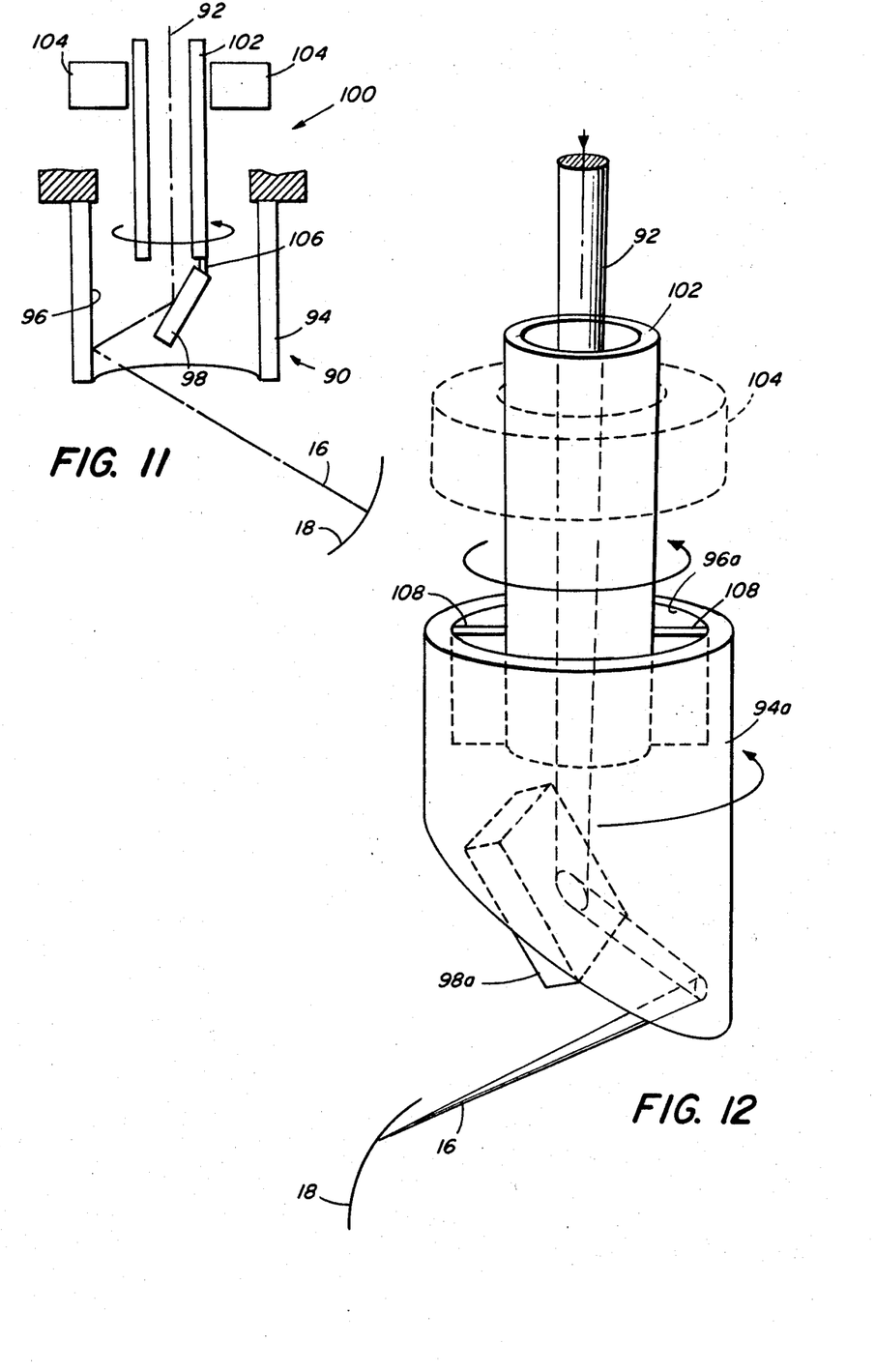

FIGS. 11 and 12 illustrate other alternate methods and apparatus for generating the hollow conical beam. Conceptually, the apparatus of FIGS. 11 and 12 can be considered as substitutes for the rotatable mirror 74 shown in the FIG. 9 embodiment. The remaining elements of FIG. 9 are applicable to the embodiments shown in FIGS. 11 and 12.

Referring first to the embodiment shown in FIG. 11, light from source 70 is directed by optics 72 to a rotating optical pointing and beam spreading assembly indicated generally by the reference numeral 90. Light source 70 and optics 72 have been omitted from FIG. 11 as well as FIG. 12 for the purpose of simplifying the figures. The converging light beam exiting from optics 72 (FIG. 9) is identified in FIGS. 11 and 12 by the reference numeral 92.

In FIG. 11, the optical beam pointing and spreading assembly 90 comprises: a fixed cylindrical reflector 94 having a concave, light reflecting inner surface 96, a movable beam directing mirror 98 and a hollow shaft motor indicated generally by the reference numeral 100. The hollow shaft motor 100 has a hollow, central shaft 102 that is rotated by a stator 104. Mirror 98 is secured with respect to the rotatable hollow shaft by a mounting bracket 106 so that the mirror and hollow shaft rotate as a unit when electrical power is applied to the motor. Rotation of the beam directing mirror 98 causes the converging light beam 90 from source 70 to sweep across the cylindrical reflecting surface 96 thereby generating the desired hollow, conical beam 16 that produces the beam intercept 18.

The embodiment shown in FIG. 11 utilizes a fixed concave cylindrical reflector 94 and a movable beam directing mirror 98. The hollow, conical beam 16 also can be generated by a movable concave cylindrical reflector 94a and a movable beam directing mirror 98a as shown in the embodiment of FIG. 12. In this embodiment both the reflector 94a and mirror 98a are secured with respect to and rotatable with the hollow motor shaft 102. The beam directing mirror 98a is secured to the cylindrical reflector which in turn is mounted on the hollow shaft of the motor by means of spiders 108.

Having described in detail a preferred embodiment of my invention, it will now be obvious to those skilled in the art that numerous modifications can be made therein without departing from the scope of the invention as defined in the following claims.

What I claim and desire to secure by Letters Patent of the United States is:

1. Method for image acquisition comprising the steps of:
   A. passing a beam of collimated light through a hollow, rotatable motor shaft to a beam directing mirror that is secured with respect to and rotatable with said hollow, rotatable motor shaft;
   B. reflecting said beam of collimated light from said beam directing mirror
   C. impinging the resulting reflected beam of collimated light on a concave, cylindrical reflective surface to produce a conical beam of light having an angular arc that is a function of the radius of the concave, cylindrical reflective surface and the width of the collimated light beam impinging thereon;
   D. illuminating at least a portion of an object with said conical beam of light; and,
   E. imaging at least part of said light beam illuminated portion of the object on an array of photosensitive elements to produce corresponding signals representative of the image on said array.

2. The method of claim 1 wherein at least a portion of the imaging path is coaxial with the axis of the conical beam extending from the apex thereof.

3. The method of claim 1 further comprising the step of rotating said hollow, rotatable motor shaft.

4. The method of claim 1 wherein said concave, cylindrical reflective surface is secured with respect to and rotatable with said hollow rotatable motor shaft so that the concave, cylindrical reflective surface rotates upon rotation of the hollow, rotatable motor shaft.

5. Method for image acquisition comprising the steps of:
   A. passing a beam of collimated light through a hollow, rotatable motor shaft to a beam directing mirror that is secured with respect to and rotatable with said hollow, rotatable motor shaft;
   B. reflecting said beam of collimated light from said beam directing mirror
   C. impinging the resulting reflected beam of collimated light on a concave, cylindrical reflective surface to produce a conical beam of light having an angular arc that is a function of the radius of the concave, cylindrical reflective surface and the width of the collimated light beam impinging thereon;
   D. illuminating at least a portion of an object with said conical beam of light;
   E. imaging at least part of said light beam illuminated portion of the object on an array of photosensitive elements to produce corresponding signals representative of the image on said array; and;
   F. controlling the angular width of the arc of said conical light beam as a function of the ambient light noise at said object.

6. The method of claim 5 further comprising the step of rotating said hollow, rotatable motor shaft.

7. The method of claim 5 wherein said concave, cylindrical reflective surface is secured with respect to and rotatable with said hollow rotatable motor shaft so that the concave, cylindrical reflective surface rotates upon rotation of the hollow, rotatable motor shaft.

8. Method for image acquisition comprising the steps of:
   A. passing a beam of collimated light through a hollow, rotatable motor shaft to a beam directing mirror that is secured with respect to and rotatable with said hollow, rotatable motor shaft;
   B. reflecting said beam of collimated light from said beam directing mirror C. impinging the resulting reflected beam of collimated light on a concave, cylindrical reflective surface to produce a conical beam of light having an angular arc that is a function of the radius of the concave, cylindrical reflective surface and the width of the collimated light beam impinging thereon;

D. illuminating at least a portion of an object with said conical beam of light;

E. imaging at least part of said light beam illuminated portion of the object on an array of photosensitive elements to produce corresponding signals representative of the image on said array; and, F. controlling the angular arc of said conical beam of light by sweeping the collimated beam of light transversely across said concave, cylindrical reflective surface with the angular arc length being related to the beam sweep width.

9. The method of claim 8 further comprising the step of rotating said hollow, rotatable motor shaft.

10. The method of claim 8 wherein said concave, cylindrical reflective surface is secured with respect to and rotatable with said hollow rotatable motor shaft so that the concave, cylindrical reflective surface rotates upon rotation of the hollow, rotatable motor shaft.

11. An apparatus for image acquisition comprising:
A. a rotatable reflective cylinder means having a concave reflective surface;
B. means for rotating said reflective cylinder means;
C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of an object;
D. an array means of photosensitive elements, said elements producing signals representative of the light impinging thereon;
E. means for imaging at least part of said light beam illuminated portion of the object on said array means of photosensitive elements to produce corresponding signals representative of the image on said array; and,
F. utilization means responsive to said signals.

12. The apparatus of claim 11 wherein at least a portion of the imaging path is coaxial with the axis of the conical beam extended from the apex thereof.

13. An apparatus for image acquisition comprising:
A. a rotatable reflective cylinder means having a concave reflective surface;
B. means for rotating said reflective cylinder means
C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of an object;
D. an array means of photosensitive elements, elements producing signals representative of the light impinging thereon;
E. means for imaging at least part of said light beam illuminated portion of the object on said array means of photosensitive elements to produce corresponding signals representative of the image on said array;
F. means for controlling the angular width of the arc of said conical light beam as a function of the ambient light noise at said object; and,
G. utilization means responsive to said signals.

14. An apparatus for image acquisition comprising:
A. a rotatable reflective cylinder means having a concave reflective surface;
B. means for rotating said reflective cylinder means;
C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of an object;
D. an array means of photosensitive elements, said elements producing signals representative of the light impinging thereon;
E. means for imaging at least part of said light beam illuminated portion of the object on said array means of photosensitive elements to produce corresponding signals representative of the image on said array;
F. means for controlling the angular arc of said conical beam of light by sweeping the collimated beam of light transversely across said reflective cylinder means with the angular arc length being related to the beam sweep width; and,
G. utilization means responsive to said signals.

15. In a robot having a tool for use with a workpiece, an image acquisition apparatus comprising:
A. a rotatable reflective cylinder means having a concave reflective surface and a longitudinal axis, said longitudinal axis having a selected positional relationship with respect to the tool of the robot;
B. means for rotating said reflective cylinder means
C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of the workpiece;
D. an arrary means of photosensitive elements, said elements producing signals representative of the light impinging thereon;
E. means for imaging at least part of said light beam illuminated portion of the workpiece on said array means of photosensitive elements to produce corresponding signals representative of the image on said array; and,
F. utilization means responsive to said signals for controlling the position of the tool with respect to the workpiece.

16. The apparatus of claim 14 wherein at least a portion of the imaging path is coaxial with the axis of the conical beam extended from the apex thereof.

17. In a robot having a tool for use with a workpiece an image acquisition apparatus comprising:
A. a rotatable reflective cylinder means having a concave reflective surface and a longitudinal axis, said longitudinal axis having a selected positional relationship with respect to the tool of the robot B. means for rotating said reflective cylinder means C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of the workpiece;

D. an array means of photosensitive elements, said elements producing signals representative of the light impinging thereon;

E. means for imaging at least part of said light beam illuminated portion of the workpiece on said array means of photosensitive elements to produce corresponding signals representative of the image on said array;

F. controlling the angular width of the arc of said conical light beam as a function of the ambient light noise at said workpiece; and, G. utilization means responsive to said signals for controlling the position of the tool with respect to the workpiece.

18. An apparatus for image acquisition comprising:

A. a rotatable reflective cylinder means having a concave reflective surface;

B. means for rotating said reflective cylinder means

C. beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminated at least a portion of an object;

D. an array means of photosensitive elements, and elements producing signals representative of the light impinging thereon;

E. means for imaging at least part of said light beam illuminated portion of the object on said array means of photosensitive elements to produce corresponding signals representative of the image on said array;

F. controlling the angular width of the arc of said conical light beam as a function of the ambient light noise at said object; and, G. utilization means responsive to said signals.

19. An apparatus for image acquisition comprising:

A. a rotatable reflective cylinder means having a concave reflective surface;

B. means for rotating said reflective cylinder means beam directing mirror means secured with respect to and rotatable with said rotatable reflective cylinder means for directing a beam of collimated light to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

means for imaging at least part of said light beam illuminated portion of the object on said array mens of photosensitive elements to produce corresponding signals representative of the image on said array;

F. means for controlling the angular arc of said conical beam of light by sweeping the collimated beam of light transversely across said concave reflective surface with the angular arc length being related to the beam sweep width; and, G. utilization means responsive to said signals.

20. An apparatus for image acquisition comprising:

A. a reflective cylinder means having a concave reflective surface;

B. motor means having a hollow, rotatable motor shaft

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

E. means for imaging at least part of said light beam illuminated portion of the object on said array means of photosensitive elements to produce corresponding signals representative of the image on said array; and, F. utilization means responsive to said signals.

21. The apparatus of claim 20 wherein at least a portion of the image path is coaxial with the axis of the conical beam extended from the apex thereof.

22. An apparatus for image acquisition comprising:

A. a reflective cylinder means having a concave reflective surface;

B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

E. means for imaging at least part of said light beam illuminated portion of the object on said array means or photosensitive elements to produce corresponding signals representative of the image on said array;

F. means for controlling the angular width of the arc of said conical light beam as a function of the ambient light noise at said object; and, G. utilization means responsive to said signals.

23. An apparatus for image acquisition comprising:

A. a reflective cylinder means having a concave reflective surface;

B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

E. means for imaging at least part of said light beam illuminated portion of the object on said array means of photosensitive elements to produce corresponding signals representative of the image on said array;

F. means for controlling the angular arc of said conical beam of light by sweeping the collimated beam of light transversely across said reflective cylinder means with the angular arc length being related to the beam sweep width; and, G. utilization means responsive to said signals.

24. In a robot having a tool for use with a workpiece, an image acquisition apparatus comprising:

A. a reflective cylinder means having a concave reflective surface and a longitudinal axis, said longitudinal axis having a selected positional relationship with respect to the tool of the robot;

B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of the workpiece;

D. an array means of photosensitive elements, said elements producing signals representative of the light impinging thereon;

E. means for imaging at least part of said light beam illuminated portion of the workpiece on said array means of photosensitive elements to produce corresponding signals representative of the image on said array; and, F. utilization means responsive to said signals for controlling the position of the tool with respect to the workpiece.

25. The apparatus of claim 23 wherein at least a portion of the imaging path is coaxial with the axis of the conical beam extended from the apex thereof.

26. In a robot having a tool for use with a workpiece an image acquisition apparatus comprising:

A. a reflective cylinder means having a concave reflective surface and a longitudinal axis, said longitudinal axis having a selected positional relationship with respect to the tool of the robot B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of the workpiece;

D. an array means of photosensitive elements, said elements producing signals representative of the light impinging thereon;

E. means for imaging at least part of said light beam illuminated portion of the workpiece on said array means of photosensitive elements to produce corresponding signals representative of the image on said array;

F. controlling the angular width of the arc of said conical light beam as a function of the ambient light noise at said workpiece; and, G. utilization means responsive to said signals for controlling the position of the tool with respect to the workpiece.

27. An apparatus for image acquisition comprising:

A. a reflective cylinder means having a concave reflective surface;

B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

E. means for imaging at least part of said light beam illuminated portion of the object on said array means of photosensitive elements to produce corresponding signals representative of the image on said array;

F. controlling the angular width of the arc of said conical light beam as a function of the ambient light noise at said object; and, G. utilization means responsive to said signals.

28. An apparatus for image acquisition comprising:

A. a reflective cylinder means having a concave reflective surface;

B. motor means having a hollow, rotatable motor shaft;

C. beam directing mirror means secured with respect to and rotatable with said hollow rotatable motor shaft for directing a beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of an object;

D. an array means of photosensitive elements, said elements producing signals representative of the light impinging thereon;

E. means for imaging at least part of said light beam illuminated portion of the object on said array mens of photosensitive elements to produce corresponding signals representative of the image on said array;

F. means for controlling the angular arc of said conical beam of light by sweeping the collimated beam of light transversely across said concave reflective surface with the angular arc length being related to the beam sweep width; and, G. utilization means responsive to said signals.

* * * * *

UNITED STATES PATENT AND TRADEMARK OFFICE
CERTIFICATE OF CORRECTION

PATENT NO. : 4,413,180

DATED : November 1, 1983

INVENTOR(S) : Charles J. Libby

It is certified that error appears in the above-identified patent and that said Letters Patent are hereby corrected as shown below:

Column 1, line 67, "mens" should be "means";

Column 9, line 57, before "beam" insert -- C. --;

Column 10, line 1, before "means" insert --E.--;

line 3, "mens" should be "means";

line 37, "image" should be "imaging";

Column 13, line 3, "mens" should be "means".

Signed and Sealed this

Fifteenth Day of January 1985

[SEAL]

Attest:

Attesting Officer

GERALD J. MOSSINGHOFF

Commissioner of Patents and Trademarks